United States Patent
Enomoto

Patent Number: 6,128,442
Date of Patent: Oct. 3, 2000

[54] TREMBLING COMPENSATION AND CONTROL APPARATUS FOR CAMERA

[75] Inventor: Shigeo Enomoto, Tokyo, Japan

[73] Assignee: Asahi Kogaku Kogyo Kabushiki Kaisha, Tokyo, Japan

[21] Appl. No.: 09/369,354

[22] Filed: Aug. 6, 1999

[30] Foreign Application Priority Data

Aug. 11, 1998 [JP] Japan ................................ 10-227060

[51] Int. Cl.$^7$ ................................................. G03B 17/00
[52] U.S. Cl. ................................................................ 396/53
[58] Field of Search ................................. 396/52, 53, 54, 396/55; 348/208; 359/554, 555, 556, 557

[56] References Cited

U.S. PATENT DOCUMENTS

| | | | |
|---|---|---|---|
| 4,996,545 | 2/1991 | Enomoto et al. | 396/53 |
| 5,150,150 | 9/1992 | Enomoto | 396/53 |
| 5,541,693 | 7/1996 | Enomoto | 396/53 |
| 5,754,339 | 5/1998 | Kanai et al. | 359/557 |
| 5,805,212 | 9/1998 | Fujiwara | 396/52 X |
| 5,809,348 | 9/1998 | Fujisaki | 396/55 |
| 5,822,623 | 10/1998 | Urata et al. | 396/52 |

FOREIGN PATENT DOCUMENTS

| | | |
|---|---|---|
| 6-265962 | 9/1994 | Japan . |
| 9-61729 | 3/1997 | Japan . |

*Primary Examiner*—W. B. Perkey
*Attorney, Agent, or Firm*—Greenblun & Bernstein, P.L.C.

[57] ABSTRACT

A trembling compensation and control apparatus detects an angular displacement of an optical axis of a focusing optical system and drives and controls an compensation optical system so as to compensate for trembling of a camera. The angular displacement of the optical axis of the focusing optical system is detected by an angular velocity sensor. A low-cut filter is provided that processes and calculates an angular displacement velocity signal output from the angular velocity sensor. The low-cut filter cuts a low frequency component from the angular displacement velocity signal and outputs a valid angular displacement velocity signal. The valid angular displacement velocity signal is converted by an integration portion into an angular displacement signal. A level detector is further disposed for detecting the valid angular displacement velocity signal. The low-cut filter and the integration portion are modified in calculation processing when said level exceeds a predetermined level, and are reset in calculation processing when the level becomes within the predetermined level again.

5 Claims, 7 Drawing Sheets

TREMBLING COMPENSATION AND CONTROL APPARATUS FOR CAMERA

BACKGROUND OF THE INVENTION

1. Field of the Invention

The present invention relates to a movement compensation and control apparatus incorporated within a camera, which prevents a trembling of a picture due to unintentional movement such as camera shake.

2. Description of the Related Art

In a conventional trembling compensation and control apparatus, an angular displacement of an optical axis is detected by a vibration gyro or other angular velocity sensors, and an angular displacement velocity signal output from the angular velocity sensor is input to a low-cut filter which eliminates the low frequency component including direct current (DC) offset component. The angular displacement velocity signal is integrated, in an integration calculation portion, so as to be converted into an angular displacement signal. A compensation optical system is controlled in response to the angular displacement signal such that the movement is canceled, and a photograph is prevented from trembling. However, the conventional apparatus is ineffective for large movements, as in cases of panning and tilting.

Although the low-cut filter gradually eliminates the DC component, the angular displacement velocity signal output from the angular velocity sensor includes a much larger DC component during panning and tilting, than that caused by usual camera shake. This excessively high DC component is input to the low-cut filter which eliminates the DC component at low speed. Therefore, the DC component cannot be completely canceled, and the remaining DC component is integrated. As a result, the angular displacement signal increases steeply. When the panning or the tilting is completed, the output of the low-cut filter is reversed and is integrated such that the angular displacement signal decreases steeply.

The movement compensation is unnecessary for panning and tilting as they are intentional movements, however the conventional trembling compensation apparatus strongly activates the compensation optical system, causing substantial picture movement compensation, which is uncomfortable for the photographer.

SUMMARY OF THE INVENTION

Therefore, an object of the present invention is to provide a trembling compensation and control apparatus that prevents the compensation of the movement due to panning and tilting and prevents uncomfortable movement of the picture.

A trembling compensation and control apparatus, according to the present invention, detects an angular displacement of an optical axis of a focusing optical system and drives and controls a compensation optical system so as to compensate a trembling of an image, and comprises an angular velocity sensor, a low-cut filter, an integration portion and a level detector.

The angular velocity sensor detects the angular displacement of the optical axis of the focusing optical system. The low-cut filter processes and calculates an angular displacement velocity signal output from the angular velocity sensor, cuts a low frequency component from the angular displacement velocity signal and outputs a valid angular displacement velocity signal. The integration portion converts the valid angular displacement velocity signal through a calculation into an angular displacement signal. The level detector detects the valid angular displacement velocity signal. The low-cut filter and the integration portion are modified in calculation processing when the level exceeds a predetermined level. The low-cut filter and the integration portion are reset in calculation processing when the level becomes within the predetermined level again.

Preferably, when the level detector detects that the level exceeds the predetermined level, the low-cut filter is modified such that the valid angular displacement velocity signal is a subtraction of a predetermined value from the angular displacement signal input to the low-cut filter.

The level of the valid angular displacement velocity signal may be a signal level of the low frequency component subtracted from the angular displacement signal input to the low-cut filter immediately prior to the level exceeding the predetermined level, and the predetermined value may be the level of the valid angular displacement signal immediately prior to the level exceeding the predetermined level.

Optionally, the low-cut filter calculates the valid angular displacement velocity signal Vo according to a formula (1), wherein the angular displacement velocity signal input to the low-cut filter is Vi, the valid angular displacement velocity signal output from the low-cut filter is Vo, and a cut-off constant for cutting a predetermined frequency component is K1, $$V_o = (Vi - K1 \times \Sigma V_o) \quad (1)$$

When the angular displacement signal is Vh and a constant for the integration portion is K2, the angular displacement signal Vh is calculated from a formula (2), $$Vh = K2 \times \Sigma V_o \quad (2)$$

When it is detected that the level of the angular displacement signal exceeds the predetermined level, the low-cut filter calculates the valid angular displacement signal Vo without calculating the formula (1) and calculates the angular displacement signal Vh without calculating the formula (2).

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENTS

The preferred embodiment of the present invention is described below with reference to the attached drawings.

Figure 1:
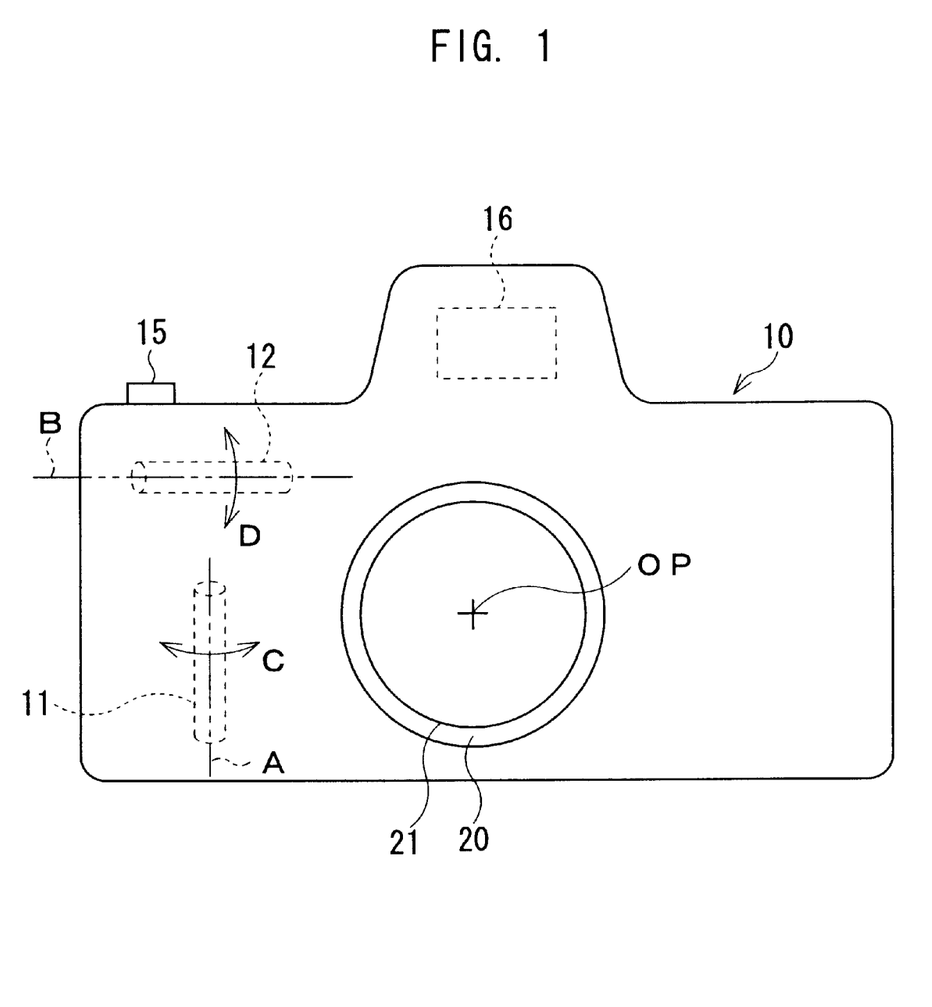
FIG. 1 is an elevation view showing a camera including an embodiment of a trembling compensation and control apparatus according to the present invention.

FIG. 1 is an elevation view showing a camera including an embodiment of a trembling compensation and control apparatus according to the present invention.

The camera 10 is a single-lens reflex camera which includes the trembling compensation and control apparatus for compensating camera shake or other unintentional movement of the camera.

A lens-barrel 20 is attached to the front side of the camera 10, and a photographing optical system 21 is disposed in the lens-barrel 20. Angular velocity sensors 11 and 12 are disposed in the camera, which are gyros for sensing an angular displacement of optical axis OP of the photographing optical system. Angular velocities in the direction C and D around the axes are detected by the velocity sensors 11 and 12. The angular velocity sensors 11 and 12 have rotational spindles A and B, respectively, which are perpendicular to each other. The angular velocity sensor 11 detects the angular velocity in the direction C of the optical axis OP of the photographing optical system 21, and the angular velocity sensor 12 detects the angular velocity in the direction D of the optical axis OP of the photographing optical system 21.

A view-finder 16 is disposed on the rear side of the camera 10, through which a photographer monitors a picture of a visual field. The picture of the visual field is photographed by pushing a release button 15 disposed on an upper surface of the camera 10.

Figure 2:
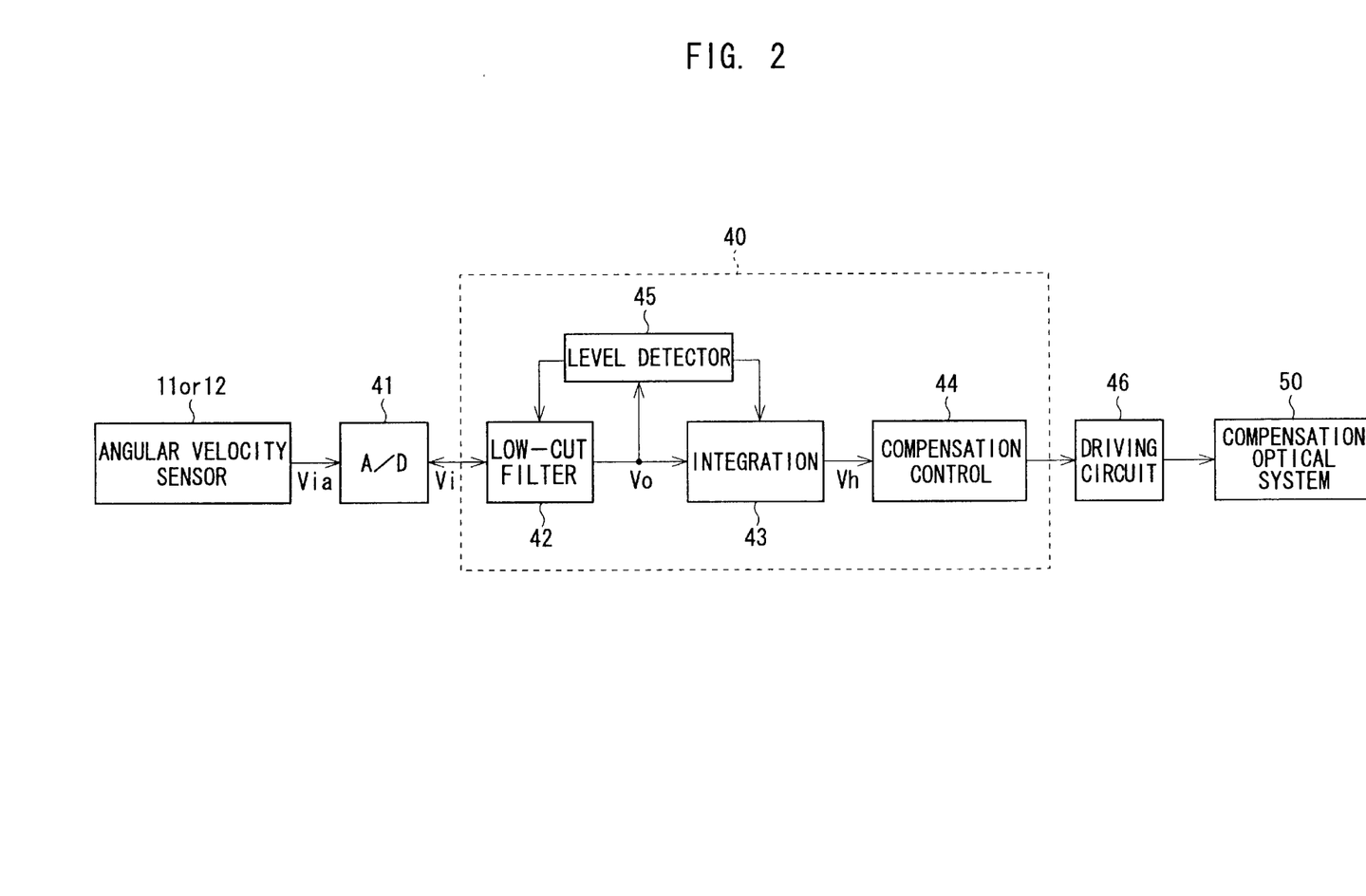
FIG. 2 is a block diagram showing the embodiment of the trembling compensation and control apparatus.

The embodiment of the trembling compensation and control apparatus is described with reference to FIGS. 1 and 2. FIG. 2 is a block diagram showing the embodiment of the trembling compensation and control apparatus.

The trembling compensation and control apparatus includes a compensation optical system 50 for compensating the trembling. The compensation optical system 50 includes a compensation lens which is operated by a driving circuit 46 on a plane perpendicular to the optical axis OP of the photographing optical system 21. A central processing unit (CPU) 40 is, for example, a one-chip micro-computer which executes a program of calculation processing for trembling compensation. The calculation process is represented by the block CPU 40, within the block diagram FIG. 2. According to the calculation processing by the CPU 40, the compensation optical system 50 is driven in response to an output signal of an angular velocity sensor 11, such that the trembling in the direction C is canceled. The trembling in the direction D is canceled in response to an output signal of an angular velocity sensor 12. Thus, a two-dimensional picture movement compensation is performed.

The calculation process comprises a low-cut filter 42, an integration calculation portion 43, a compensation control portion 44 and a level detector 45. The low-cut filter 42, the integration calculation portion 43 and the compensation control portion 44 are serially connected. The level detector 45 is connected to a control input of the low-cut filter 42 and of the integration calculation portion 43 and outputs signals to these components. The low-cut filter 42 eliminates the low frequency component of an input signal Vi, the integration calculation portion 43 integrates an input signal Vo, and the compensation control portion 44 controls a driving circuit 46 in response to an input signal Vh and performs the calculation for driving the compensation optical system. The level detector 45 detects the level of the output Vo of the low-cut filter 42.

The trembling compensation process is described in detail below. The angular velocity sensor 11 detects the angular velocity in a rotational direction C of the optical axis OP of the optical system 21 and outputs an angular displacement velocity signal Via. This angular displacement velocity signal Via is converted from analog into a digital angular displacement velocity signal Vi by the digital (A/D) converter.

Since a low frequency component is usually superimposed on the angular displacement velocity signal Via output from the angular displacement velocity signal Via, the low-cut filter 42 cuts off the low frequency component in the digital angular displacement velocity signal Vi and outputs a valid angular displacement velocity signal Vo. This valid angular displacement velocity signal Vo is integrated by the integration calculation portion 43 and is thus converted into an angular displacement signal Vh. The compensation control portion 44 controls the driving circuit 46 according to the angular displacement signal Vh and the compensation optical system is executed such that the trembling is canceled and compensated.

The level detection process is described below. A camera with the trembling compensation and control apparatus is panned (in a horizontal direction) and tilted (in a vertical direction) in order to change the visual field and visual direction of the camera. This movement activates the trembling compensation and control apparatus. The trembling compensation and control apparatus of this embodiment includes the level detector 45 which prevents the unnecessary and uncomfortable compensation of the picture during panning and tilting.

Figure 3:
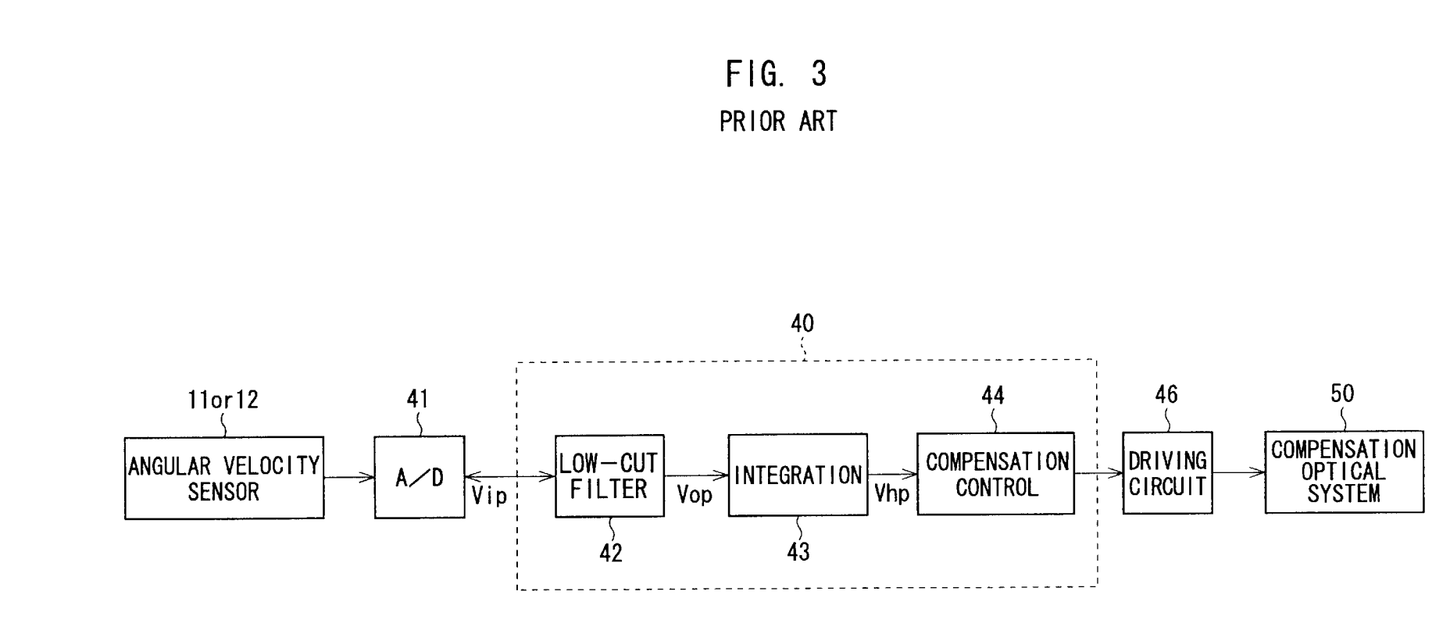
FIG. 3 is a block diagram showing the conventional trembling compensation and control apparatus.
Figure 4:
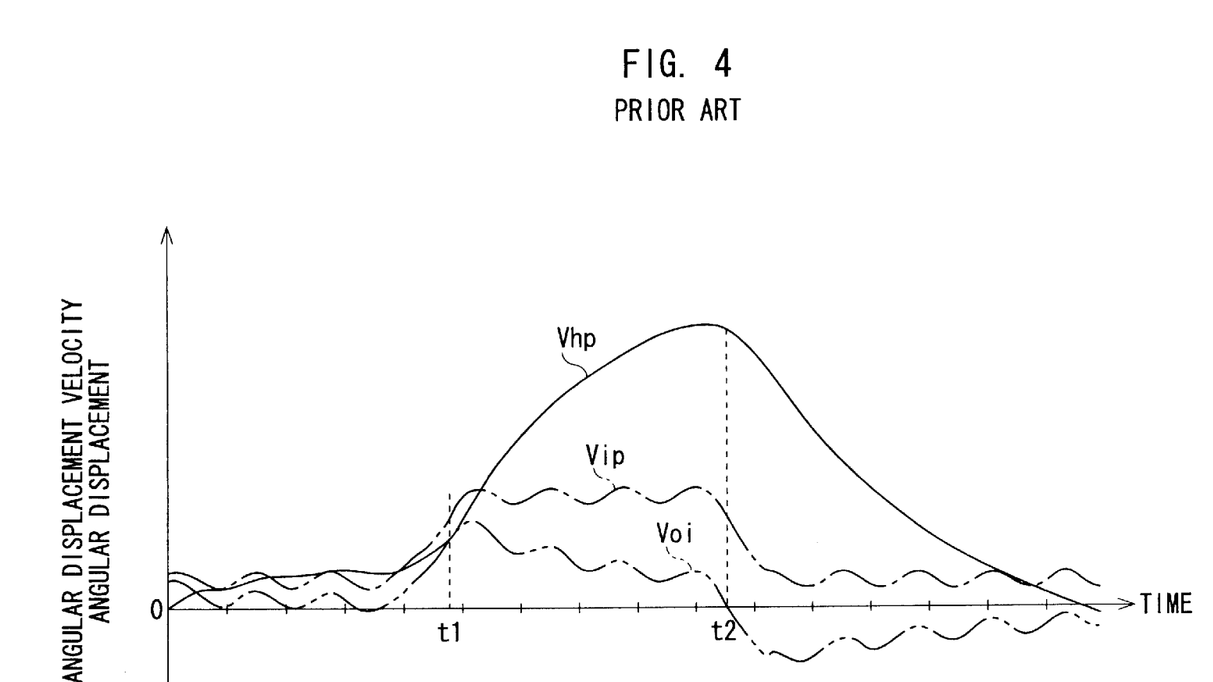
FIG. 4 is a graph showing a relationship between the change of signals of the conventional trembling compensation and control apparatus and time.
Figure 5:
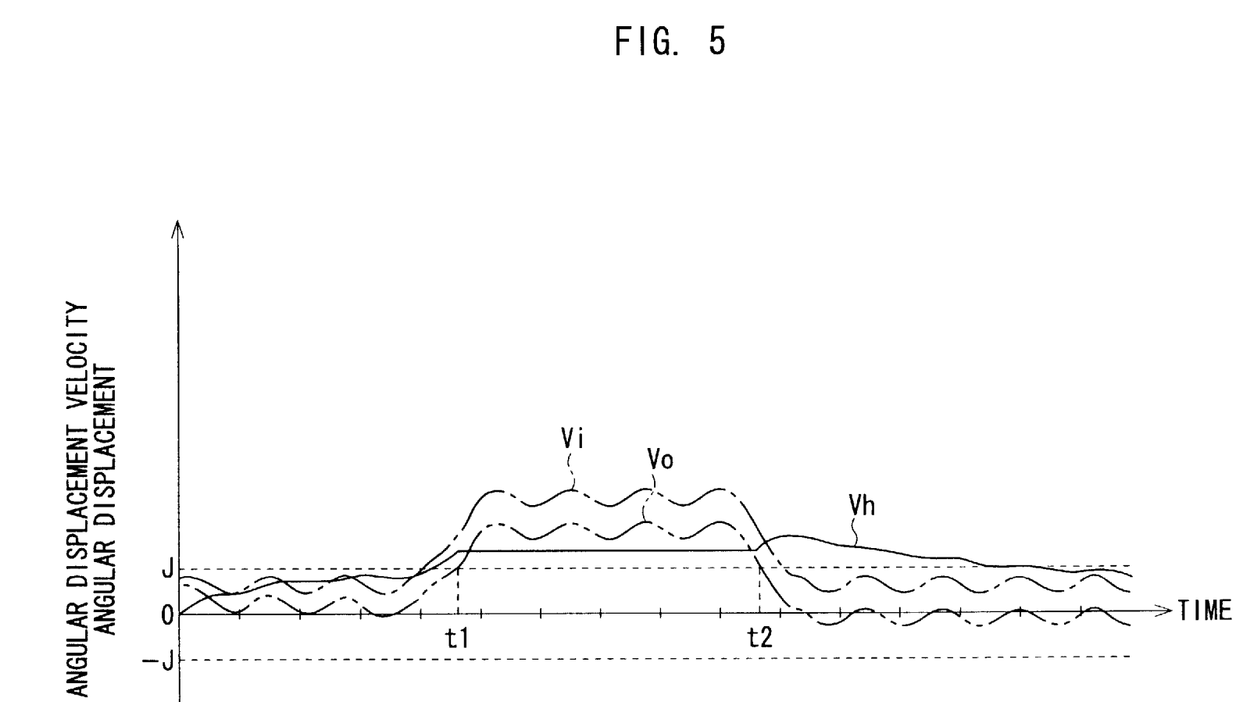
FIG. 5 is a graph showing a relationship between the change of signals of the embodiment of the trembling compensation and control apparatus and time.

FIG. 3 is a block diagram showing the conventional trembling compensation and control apparatus. FIG. 4 is a graph showing a relationship between change of signals of the conventional trembling compensation and control apparatus and time. FIG. 5 is a graph showing a relationship between change of signals of the embodiment of the trembling compensation and control apparatus and time. In FIG. 3, components of similar function to those in the present embodiment are represented by the same references. In FIGS. 4 and 5, the horizontal coordinate represents time, whilst, the vertical coordinate represents the angular displacement velocity with respect to the digital angular displacement signals, Vip and Vi, and to the valid angular displacement velocity signals Vop and Vo, and illustrates the angular displacement with respect to the angular displacement signal Vhp and Vh.

The trembling compensation and control apparatus without a level detector is described below with reference to FIGS. 3 and 4. When panning or tilting is commenced at a time "t1", a much larger movement occurs than a movement due to camera shake. Thus, the digital angular displacement velocity signal Vip steeply increases due to the substantial DC component.

The panning or tilting continues from the time "t1" to time "t2". The low-cut filter 42 gradually decreases the DC component in the digital angular displacement velocity signal Vip. When the digital angular displacement velocity signal Vip, which has been steeply increased, is input to the low-cut filter 42, the low frequency component is gradually eliminated from the digital angular displacement velocity signal Vip and consequently the valid angular displacement velocity signal Vop gradually approaches "0" level. However, it requires much time to reach "0" level, as the digital angular displacement velocity signal Vip is extremely high. The angular displacement signal Vhp, as the integration of the valid angular displacement signal Vop by the integration calculation portion 43, steeply increases.

When the panning or tilting is completed at the time "t2", the digital angular displacement velocity signal Vip steeply decreases. The valid angular displacement velocity signal Vop output from the low-cut filter 42 flows in the reversed direction and gradually approaches "0". Thus, the angular displacement signal Vhp output from the integration calculation portion 43 steeply decreases.

In the trembling compensation and control apparatus without level detection, the angular displacement signal Vhp output from the integration calculation portion 43 changes substantially and suddenly during panning and tilting. The compensation optical system 50 is driven according to the angular displacement signal Vhp and a large displacement is generated to compensate for the movement. It is uncomfortable for the photographer.

The trembling compensation is unnecessary for panning and tilting as they are intentional movements. In the embodiment, the trembling compensation and control apparatus includes a level detector 45 (FIG. 2) for the prevention of these large and uncomfortable picture displacements due to compensation.

FIGS. 2 and 5 are referred to in the below description. In the trembling compensation and control apparatus of the embodiment, the level detector 45 detects the level of the valid angular displacement velocity signal Vo output from the low-cut filter 42 to determine whether the level exceeds a predetermined value J. Thus, panning and tilting are detected.

When panning or tilting is commenced at the time "t1", the digital angular displacement velocity signal Vip steeply increases, and the valid angular displacement velocity signal Vo output from the low-cut filter steeply increases. The level detector 45 determines that the level of the valid angular displacement velocity signal Vo is greater than the predetermined value, thus, detecting panning or tilting. The level detector 45 modifies the low-cut filter 42 and the integration calculation portion 43 so as to prevent the performance of trembling compensation. At this time, the low-cut filter 42 subtracts a predetermined value from the digital angular displacement velocity signal Vi, and the integration calculation portion 43 outputs a constant value of the angular displacement signal.

Between the time "t1" and "t2", as the panning or tilting continues, the digital angular displacement velocity signal Vi includes an excessive DC component. The level of the valid angular displacement velocity signal Vo is greater than the predetermined level J, and the panning or tilting is detected. The low-cut filter 42 subtracts a predetermined value from the digital angular displacement velocity signal Vi, and the integration calculation portion 43 outputs a constant value of the angular displacement signal. Between the time "t1" to "t2", since the angular displacement signal Vh is constant, the compensation control portion 44 does not drive the compensation optical system 50.

Thus, trembling compensation is not performed. When the panning or tilting is completed at the time "t2", the digital angular displacement velocity signal Vi steeply decreases. The level of the valid angular displacement velocity signal Vop output from the low-cut filter 42, is reduced below the predetermined value J. The level detector 45 determines that the level of the valid angular displacement signal Vo has become less than the predetermined value J and that the panning or tilting is completed. Subsequently, the low-cut filter 42 and the integration calculation portion 43 are reset to perform trembling compensation.

Figure 6:
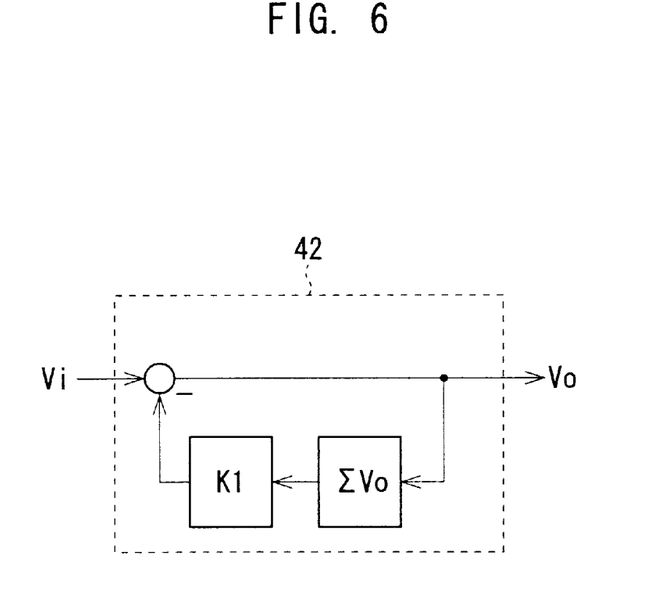
FIG. 6 is a control block diagram showing the performance of the low-cut filter.

The calculation processing of the low-cut filter 42 is described below with reference to FIG. 6. FIG. 6 is a control block diagram showing the performance of the low-cut filter.

The low-cut filter performs the calculation as shown in the formula (1) below. In the formula (1), the digital angular displacement velocity signal input to the low-cut filter 42 is Vi, the valid angular displacement velocity signal output from the filter 42 is Vo, and a cut-off constant for eliminating a predetermined frequency component is K1.

$$V_o = (Vi - K1 \times \Sigma V_0) \quad (1)$$

The low frequency component (including the DC component) is calculated by multiplying the integration of the valid angular displacement velocity signal Vo by K1. The calculated low frequency component is subtracted from the digital valid angular displacement velocity signal Vi, thus the valid angular displacement velocity signal Vo is obtained.

When the panning or tilting is detected, from a level greater than the predetermined level of the valid angular displacement velocity signal Vo, the low-cut filter 42 does not perform the calculation of $\Sigma V_0$ of the formula (1), that is, the valid angular displacement velocity signal is obtained without the integration of the valid angular displacement velocity signal Vo. The valid angular displacement velocity signal Vo is obtained by subtracting a predetermined value from the digital angular displacement velocity signal Vi. The predetermined value is the signal level subtracted from the digital angular displacement velocity signal input to the low-cut filter immediately preceding the excessive level of the valid angular displacement velocity signal Vo over the predetermined level J.

The function of the low-cut filter 42 is modified to prevent the valid angular displacement velocity signal Vo from flowing in the reverse direction (in FIG. 3) due to the operation of the low-cut filter 42.

Figure 7:
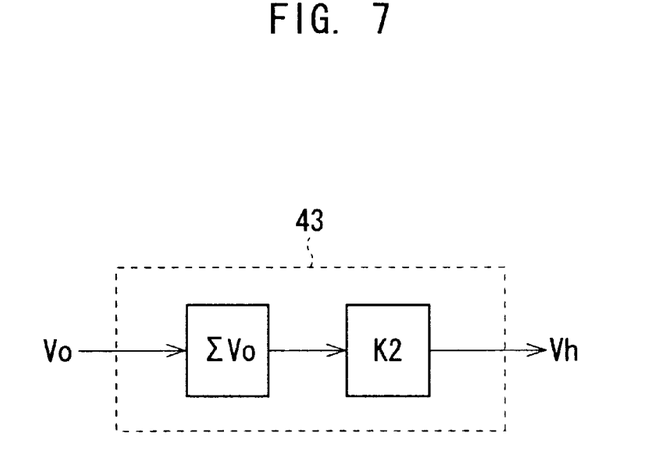
FIG. 7 is a control block diagram showing the performance of the integration calculation portion.

The calculation processing of the integration calculation portion 43 is described below with reference to FIG. 7. FIG. 7 is a control block diagram showing the performance of the integration calculation portion.

In the integration calculation portion 43, the calculation is performed as shown in the formula (2) below. In the formula (2), the valid angular displacement velocity signal input to the calculation portion 43 is Vo, the angular displacement signal output from the calculation portion 43 is Vh, and a constant is K2.

$$Vh = K2 \times \Sigma V_0 \quad (2)$$

The angular displacement Vh is obtained by multiplying an integration of the valid angular displacement velocity signal Vo by K2.

When the panning or tilting is detected by the level detector 45, from a level greater than the predetermined level of the valid angular displacement velocity signal Vo, the integration calculation portion 43 does not perform the calculation of $\Sigma V_0$ of the formula (2), that is, the angular displacement signal Vh is obtained without the integration of the valid angular displacement velocity signal Vo. The level of the angular displacement signal Vh is constant during the panning or tilting, and this constant value is equal to signal level of the angular displacement signal Vh when the level of the valid angular displacement velocity signal Vo exceeds the predetermined level J.

Figure 8:
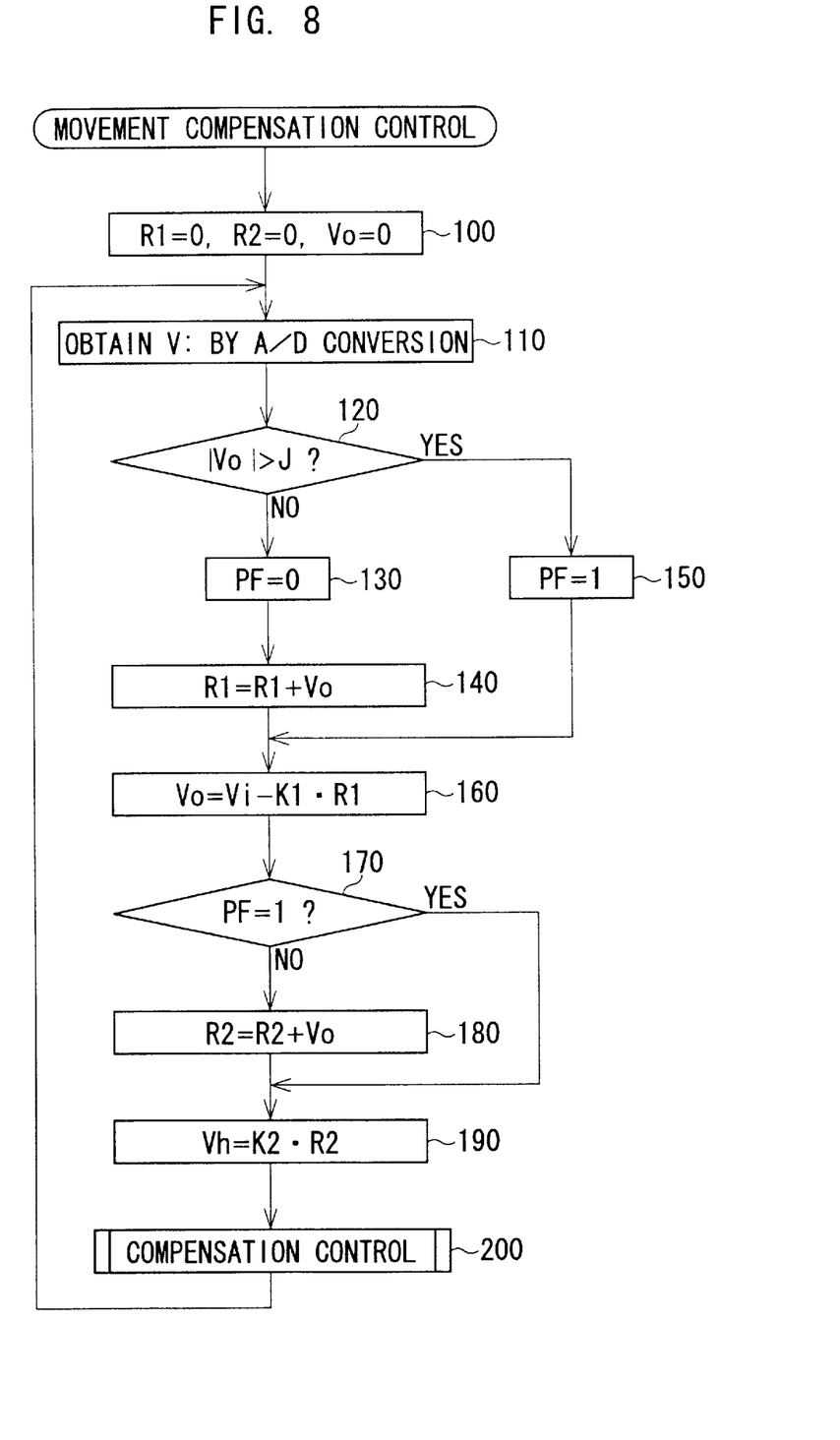
FIG. 8 is a flow chart showing the trembling compensation routine for compensating and controlling the picture during unintentional movement.

The trembling compensation and control routine is described below with reference to FIG. 8. The trembling compensation and control routine is executed in the CPU in FIG. 2 and corresponds to the processing in the calculation processing portions 42 to 45.

In step 100, a parameter R1 for integrating the valid angular displacement velocity signal Vo output from the low-cut filter 42 in FIG. 5 is set to an initial value "0", and a parameter R2 for integrating the valid angular displacement velocity signal Vo input to the integration calculation portion 43 in FIG. 6 is set to an initial value "0". Further, the valid angular displacement velocity signal Vo output from the low-cut filter 42 is set to an initial value "0".

In step 110, the angular displacement velocity signal Via detected by the angular velocity sensor 11 or 12, is converted to obtain the digital angular displacement velocity signal Vi.

In step 120, it is determined whether or not the valid angular displacement velocity signal Vo exceeds the predetermined level J (FIG. 4). If the valid angular displacement velocity signal Vo does not exceed the predetermined level J, that is, neither panning nor tilting is occurring, a flag PF indicating the displacement of the optical axis OP is set to "0" in step 130.

The flag PF is "0" when usual camera shake occurs, and is "1" when panning or tilting occurs.

In step 140, the valid angular displacement velocity signal Vo is added to the parameter R1, to be a value of the parameter R1. Thus, the valid angular displacement velocity signal Vo is integrated, after which step 160 is executed.

If the valid angular displacement velocity signal Vo exceeds the predetermined level J (FIG. 4), the flag PF is set to "1" indicating panning or tilting in step 150, and then step 160 is executed.

In step 160, the valid angular displacement velocity signal Vo is calculated as shown in the formula (3) below, from the digital angular displacement velocity signal Vi, the parameter R1, and the cut-off constant K1 for cutting off the predetermined frequency.

$$V_o = Vi - K1 \times R1 \qquad (3)$$

In other words, the low frequency to be eliminated is calculated from the term "K1×R1" in the formula (3), when PF is "0". The valid angular displacement velocity signal Vo is a signal generated by a subtraction, of the low frequency component to be eliminated, from the digital angular displacement velocity signal Vi. When PF is "1", the value of the term "K1×R1" in the formula (3) is equal to "K1×R1" immediately prior to the valid angular displacement velocity signal Vo exceeding the predetermined value J by skipping step 140. Thus, the valid angular displacement velocity signal Vo is a subtraction of the predetermined value from the digital angular displacement velocity signal Vi.

In step 170, it is determined whether or not the flag PF indicating the condition of the angular displacement of the optical axis OP is "1". When PF is determined to be not "1", as in the normal camera shake condition, the valid angular displacement velocity signal Vo is added to the parameter R2 to be a value of the parameter R2 in step 180. Thus, the valid angular displacement velocity signal Vo is integrated. Following the integration of the valid angular displacement velocity signal Vo, step 190 is executed.

When PF is judged to be "1", as in the panning or tilting condition, step 190 is executed.

In step 190, the angular displacement signal Vh is calculated from the valid angular displacement velocity signal Vo, the parameter R2 and the constant K2, as in the formula (4) below.

$$Vh = K2 \times R2 \qquad (4)$$

In other words, the valid angular displacement signal Vo is integrated according to the term "K2×R2" in the formula (4), when PF is "0". The angular displacement signal Vh is a signal generated by an integration of the valid angular displacement velocity signal Vo. When PF is "1", the value of the R1 in the formula (4) is equal to R2 immediately prior to the valid angular displacement velocity signal Vo exceeding the predetermined value J by skipping step 180. Thus, the level of the angular displacement signal Vh is equal to the level of angular displacement signal Vh immediately prior to the valid angular displacement velocity signal Vo exceeding the predetermined value J. The angular displacement signal Vh is constant when the PF is "1", that is, during panning or tilting.

In step 200, the compensation optical system 50 is operated by the compensation control portion 44 according to the angular displacement signal Vh in step 200. The conversion in step 110 is executed again.

The trembling compensation routine is executed when the camera having the trembling compensation and control apparatus is in an operation mode. The routine is stopped when the camera is in a non-operation mode.

In the above trembling compensation and control apparatus, it is determined whether or not the level of the valid angular displacement velocity signal Vo output from the low-cut filter exceeds the predetermined level J, by the level detector 45, such that panning and tilting is detected. Unnecessary compensation is prevented by modifying the low-cut filter 42 and the integration calculation portion 43. The uncomfortable compensation motion for the photographer is prevented.

It may also be possible to position the level detector following the A/D converter such that panning and tilting are detected from the output signal of the A/D converter. However, this construction is disadvantageous in that the output signal of the A/D converter includes an unstable offset component, with respect to time and temperature, such as the DC component of the angular velocity sensor. The above embodiment, which detects the level of the valid angular displacement velocity signal output from the low-cut filter, is more accurate in detecting panning and tilting.

In the above embodiment of the trembling compensation and control apparatus, the A/D converter, the low-cut filter, the integration calculation portion and the level detector are realized by software, however, they may be substituted by hardware with the provision of an additional switch for the selection of the low-cut filter or the integration calculation portion. In this case, the additional switch is operated when the panning or tilting is detected, such that the low-cut filter and the integration calculation portion are alternatively switched.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 10-227060 (filed on Aug. 11, 1998) which is expressly incorporated herein, by reference, in its entirety.

What is claimed is:

1. A trembling compensation and control apparatus that detects an angular displacement of an optical axis of a focusing optical system and drives and controls an compensation optical system, so as to compensate a trembling of an image, comprising:

an angular velocity sensor that detects said angular displacement velocity of said optical axis of said focusing optical system;

a low-cut filter that processes and calculates an angular displacement velocity signal output from said angular velocity sensor, cuts a low frequency component from said angular displacement velocity signal and outputs a valid angular displacement velocity signal;

an integration portion that converts said valid angular displacement velocity signal through a calculation into an angular displacement signal; and a level detector that detects said valid angular displacement velocity signal, wherein said low-cut filter and said integration portion are modified in calculation processing when said level exceeds a predetermined level, and said low-cut filter and said integration portion are reset in calculation processing when said level becomes within said predetermined level again.

2. A trembling compensation and control apparatus of claim 1, wherein when said level detector detects that said level exceeds said predetermined level, said low-cut filter is modified such that said valid angular displacement velocity signal is a subtraction of a predetermined value from said angular displacement signal input to said low-cut filter.

3. A trembling compensation and control apparatus of claim 2, wherein said level of said valid angular displacement velocity signal is a signal level of said low frequency component subtracted from said angular displacement velocity signal input to said low-cut filter immediately prior to said level exceeding said predetermined level, and said predetermined value is said level of said valid angular displacement velocity signal immediately prior to said level exceeding said predetermined level.

4. A trembling compensation and control apparatus of claim 3, wherein said low-cut filter calculates said valid angular displacement velocity signal Vo according to a formula (1), wherein said angular displacement velocity signal input to said low-cut filter is Vi, said valid angular displacement velocity signal output from said low-cut filter is Vo, and a cut-off constant for cutting a predetermined frequency component is K1, $$V_O = (Vi - K1 \times \Sigma V_O) \quad (1)$$

and when said angular displacement signal is Vh and a constant for said integration portion is K2, said angular displacement signal Vh is calculated from a formula (2), $$Vh = K2 \times \Sigma V_O \quad (2)$$

and when it is detected that said level of said angular displacement signal exceeds said predetermined level, said low-cut filter calculates said valid angular displacement velocity signal Vo without calculating said formula (1) and calculates said angular displacement signal Vh without calculating said formula (2).

5. A trembling compensation and control apparatus that detects an angular displacement of an optical axis of a focusing optical system and drives and controls an compensation optical system so as to compensate trembling of a camera comprising:

an angular velocity sensor that detects said angular displacement velocity of said optical axis of said focusing optical system;

an analog to digital converter for converting an output of said angular velocity sensor;

a low-cut filter that processes and calculates an angular displacement velocity signal output from said angular velocity sensor, cuts a low frequency component from said angular displacement velocity signal and outputs a valid angular displacement velocity signal;

an integration portion that converts said valid angular displacement velocity signal through a calculation into an angular displacement signal; and a level detector that detects an output of said analog to digital converter so as to determine whether said output exceeds a predetermined level, for detecting panning and tilting of said camera, wherein said low-cut filter and said integration portion are modified in calculation processing when said level exceeds a predetermined level, and said low-cut filter and said integration portion are reset in calculation processing when said level becomes within said predetermined level again.

* * * * *